US009942050B2

United States Patent
Shi et al.

(10) Patent No.: US 9,942,050 B2
(45) Date of Patent: *Apr. 10, 2018

(54) METHOD AND APPARATUS FOR BULK AUTHENTICATION AND LOAD BALANCING OF NETWORKED DEVICES

(71) Applicant: BARRACUDA NETWORKS, INC., Campbell, CA (US)

(72) Inventors: Fleming Shi, Scotts Valley, CA (US); Luo Wang, Milpitas, CA (US)

(73) Assignee: BARRACUDA NETWORKS, INC., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/586,213

(22) Filed: May 3, 2017

(65) Prior Publication Data
US 2017/0237572 A1    Aug. 17, 2017

Related U.S. Application Data

(63) Continuation of application No. 14/858,943, filed on Sep. 18, 2015, now Pat. No. 9,680,818.
(Continued)

(51) Int. Cl.
*G06F 7/04* (2006.01)
*G06F 17/00* (2006.01)
(Continued)

(52) U.S. Cl.
CPC .......... *H04L 9/3263* (2013.01); *H04L 9/0643* (2013.01); *H04L 9/14* (2013.01);
(Continued)

(58) Field of Classification Search
CPC ... H04L 9/3263; H04L 63/105; H04L 63/107; H04L 9/302; H04L 9/0643; H04L 9/14; H04L 63/0823
(Continued)

(56) References Cited

U.S. PATENT DOCUMENTS 9,680,818 B2 *   6/2017   Shi ................... H04L 63/0815
2003/0200277 A1  10/2003  Kim
(Continued)

*Primary Examiner* — Aravind K Moorthy
(74) *Attorney, Agent, or Firm* — Duane Morris LLP; David T. Xue

(57) ABSTRACT

A new approach is proposed that contemplates systems and methods to support bulk authentication of a device associated with a user to all cloud-based services the device intends to access in one transaction instead of authenticating the device against each of the services individually. First, the device generates and transmits to one or more authentication service clusters an authentication request that includes its identification and authentication credentials in order to access to a plurality of services. Upon receiving the authentication request, the authentication service cluster(s) authenticate the device for all of the services to be accessed based on the information in the authentication request. Once the device is authenticated, the authentication service cluster(s) then retrieve entitlement information of the services to be accessed by the device, and identify the service clusters/nodes that the device will connect to for the services with the fastest response time.

28 Claims, 4 Drawing Sheets

Related U.S. Application Data

(60) Provisional application No. 62/064,395, filed on Oct. 15, 2014.

(51) Int. Cl.
| | | |
|---|---|---|
| *H04L 9/32* | (2006.01) | |
| *G06F 21/00* | (2013.01) | |
| *H04L 29/06* | (2006.01) | |
| *H04L 9/06* | (2006.01) | |
| *H04L 9/14* | (2006.01) | |
| *H04L 9/30* | (2006.01) | |

(52) U.S. Cl.
CPC .......... *H04L 9/302* (2013.01); *H04L 63/0823* (2013.01); *H04L 63/105* (2013.01); *H04L 63/107* (2013.01)

(58) Field of Classification Search
USPC ..................... 713/156, 168, 182; 726/1, 4, 7
See application file for complete search history.

(56) References Cited

U.S. PATENT DOCUMENTS

| | | |
|---|---|---|
| 2007/0121490 A1 | 5/2007 | Iwakawa |
| 2007/0276919 A1 | 11/2007 | Buchmann |
| 2010/0020718 A1 | 1/2010 | Tabbara |
| 2013/0219005 A1 | 8/2013 | Kotecha |
| 2013/0346543 A1 | 12/2013 | Benantar |
| 2014/0095532 A1 | 4/2014 | Timm |
| 2015/0149530 A1 | 5/2015 | Maret |

\* cited by examiner

METHOD AND APPARATUS FOR BULK AUTHENTICATION AND LOAD BALANCING OF NETWORKED DEVICES

CROSS-REFERENCE TO RELATED APPLICATIONS

This application is a continuation application and claims the benefit and priority of U.S. patent application Ser. No. 14/858,943, that was filed on Sep. 18, 2015, which claims the benefit and priority of U.S. Provisional Patent Application No. 62/064,395, filed on Oct. 15, 2014, and entitled "Method and apparatus for authenticating and load balancing for plurality of networked systems," both of which are incorporated herein in their entirety by reference.

BACKGROUND

Service providers are increasingly hosting and providing their web services at service clusters in a cloud, where the service clusters can be at geographically distributed locations to serve users/clients around the world and each of the service clusters includes a plurality of servers/service nodes hosting the services provided. For non-limiting examples, the network security services offered to the clients and their associated appliances include but are not limited to, content category lookup, virus signature checking, advanced threat detection by identifying behavior of the network traffic, etc.

When a user intends to access the services hosted in the cloud from associated appliances/devices such as firewalls, web filters, and gateways, the service provider needs to authenticate the identifications and credentials of the user and to ascertain the service entitlement information of the user, e.g., what types/levels of services the user and his/her associated appliance is entitled to access at certain level of priority, authorization, and duration. Since the cloud-based services can be offered by different service providers, each having its own authentication process and requirements, the appliances associated with the users may often need to authenticate itself to each of the different service providers individually in order to be able to access the services they provide. Such per-service authentication can be time-consuming and put additional burden on the appliances. In addition, since the appliances associated with the users may be globally deployed anywhere around the world, they often need to choose the closest service cluster and deal with load balancing issues for each of the different services they intend to access in order to reduce network latency and maintain service quality. It is thus desirable to be able to authenticate and manage service entitlement information for the appliances across different/heterogeneous service providers and to provide the most efficient service clusters/nodes to the appliances for fast response time.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF EMBODIMENTS

Figure 1:
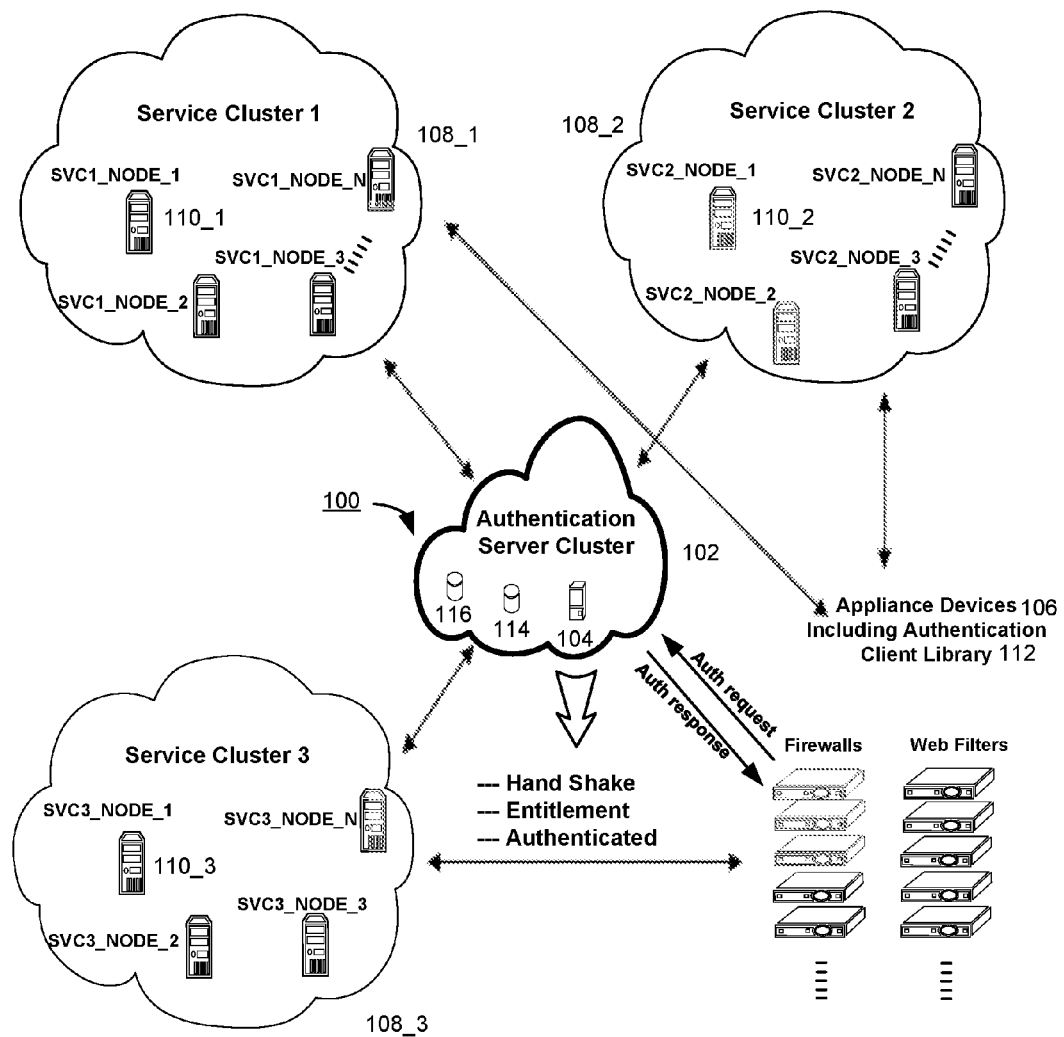
FIG. 1 depicts an example of a diagram of a system diagram to support bulk authentication of an appliance to all cloud-based services to be accessed in one transaction in accordance with some embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

A new approach is proposed that contemplates systems and methods to support bulk authentication of an appliance associated with a user to all cloud-based services the appliance intends to access in one transaction instead of authenticating the appliance against each of the services individually. First, the appliance generates and transmits to an authentication service cluster an authentication request that includes its identification and authentication credentials in order to access to a plurality of services. Upon receiving the authentication request, the authentication service cluster authenticates the appliance for all the services to be accessed based on the information in the authentication request. Once the appliance is authenticated, the authentication service cluster retrieves entitlement information of the services to be accessed by the appliance, and identifies the service clusters/nodes that the appliance will connect to for the services with the fastest response time. The authentication service cluster provides the entitlement information of the services and the identified service clusters to the appliance, which then accesses the services hosted by the identified service clusters directly based on its service entitlement information without the need to authenticate to each of the service clusters individually and/or the need for additional load balancing logic and processing outside of the system.

By providing centralized bulk authentication and management of entitlement information for a plurality of cloud-based services on per appliance basis, the proposed approach enables an appliance to authenticate itself to all of the services to be accessed in one transaction/shot and thus cuts down the overheads associated with authenticating the appliance with respect to each of the services on an individual basis. The reduction in the overhead can be significant especially in view of the growing number of services that have been made available to the appliances. In addition, by providing allocation information of the service clusters/ service nodes to the appliances, the proposed approach enables the appliances to be allocated and routed to their respective service clusters/nodes with minimum network latency without relying on Domain Name System (DNS) services and/or other load balancing equipment.

FIG. 1 shows an example of a system diagram 100 to support bulk authentication of an appliance to all cloud-based services to be accessed in one transaction. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the system 100 includes one or more authentication server clusters 102 each configured to authenticate and respond to one or more appliances 106 intended to access a plurality of cloud-based services hosted by the service clusters 108s in one transaction upon receiving an authentication request from one of the appliances 106. In some embodiments, each authentication server cluster 102 comprises a plurality of authentication servers 104 each configured to accept and serve an authentication request from the appliance 106. Here, each authentication server cluster 102 can be in a public cloud, a private cloud, or located on-premises of a user. As used herein, the term server or service node refers to software, firmware, hardware, or other component that is used to effectuate a purpose. The server will typically include a computing unit/host and software instructions that are stored in a storage unit such as a non-volatile memory (also referred to as secondary memory) of the computing unit for practicing one or more processes. When the software instructions are executed, at least a subset of the software instructions is loaded into memory (also referred to as primary memory) by the computing unit, the computing unit becomes a special purpose for practicing the processes. The processes may also be at least partially embodied in the computing unit into which computer program code is loaded and/or executed, such that, the computing unit becomes a special purpose computing unit for practicing the processes. When implemented on a general-purpose computing unit, the computer program code segments configure the computing unit to create specific logic circuits. The processes may alternatively be at least partially embodied in a digital signal processor formed of application specific integrated circuits for performing the processes. Each service node can be a computing device, a communication device, a storage device, or any electronic device capable of running a software component. For non-limiting examples, a computing device can be but is not limited to a laptop PC, a desktop PC, an iPod, an iPhone, an iPad, a Google's Android device, or a server machine. A storage device can be but is not limited to a hard disk drive, a flash memory drive, or any portable storage device.

In the example of FIG. 1, one or more appliances/computing devices 106 associated with clients/users are each configured to access one or more web-based services hosted by service providers in the clouds over the Internet. Here, each of the appliances 106 can be a computing device, a communication device, a storage device, or any electronic device capable of running a software component. For non-limiting examples, the appliances 106 can be firewalls, web filters, and/or gateways of the clients, which need to access various security services hosted by the service providers in the cloud, wherein the security services include but are not limited to content category lookup, virus signature checking, and advanced threat detection based on network traffic behavior identification.

In the example of FIG. 1, a plurality of service clusters 108s are deployed in the cloud and each configured to provide one or more types of services to the appliances 106 associated with users/clients. Each of the service clusters 108s further includes a plurality of servers/service nodes 110s configured to share the load within the service cluster 108 for providing the services to the appliances 106. In some embodiments, the service clusters 108s are deployed at distributed geographical locations to enable the appliances 106 associated with users at different parts of the world to access the services provided by the service clusters 108s in close proximity to reduce network latency.

In the example of FIG. 1, each of the authentication server cluster 102, appliances 106, and service clusters 108s are configured to communicate with each other following certain communication protocols, such as TCP/IP protocol, over one or more communication networks (not shown). Here, the communication networks can be but are not limited to, internet, intranet, wide area network (WAN), local area network (LAN), wireless network, Bluetooth, WiFi, and mobile communication network. The physical connections of the network and the communication protocols are well known to those of skill in the art.

Figure 2:
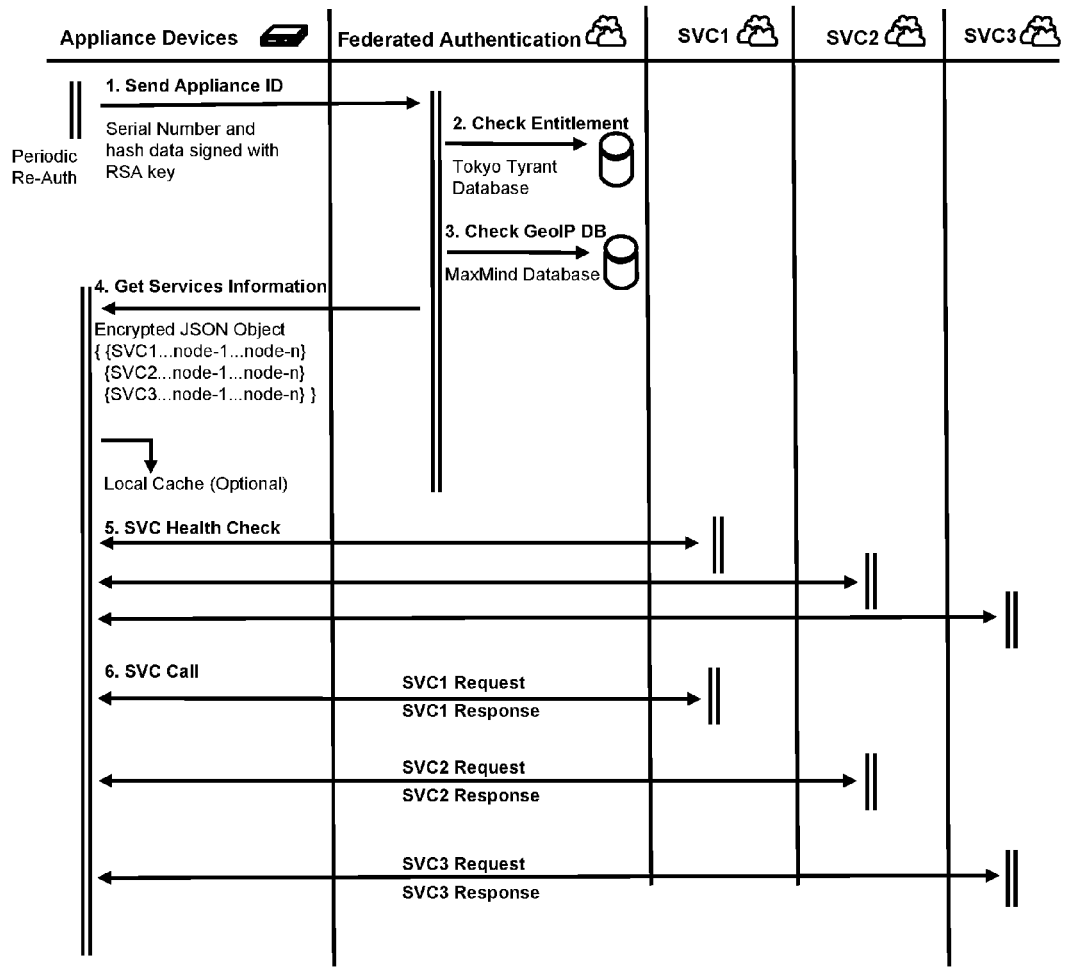
FIG. 2 depicts a sequence diagram illustrating operations of the system depicted in FIG. 1 in accordance with some embodiments.
Figure 3:
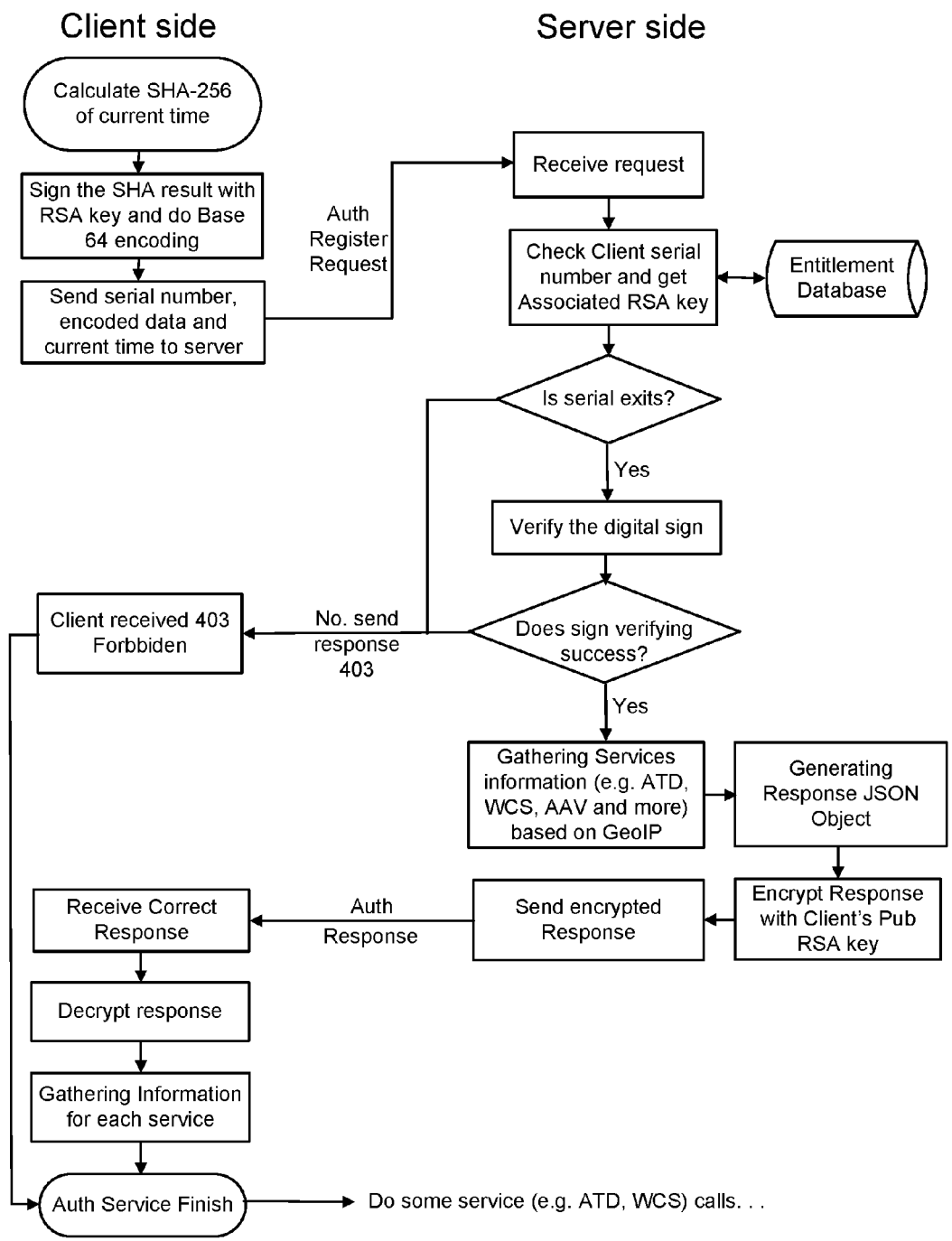
FIG. 3 depicts a flowchart illustrating interactions between the appliance and the authentication server cluster in the system depicted in FIG. 1 in accordance with some embodiments.

FIG. 2 depicts a sequence diagram illustrating the operations of the system 100 depicted in FIG. 1 and FIG. 3 depicts a flowchart illustrating interactions between the appliance 106 and the authentication server cluster 102 in the system 100 depicted in FIG. 1. Although the figure depicts functional steps in a particular order for purposes of illustration, the processes are not limited to any particular order or arrangement of steps. One skilled in the relevant art will appreciate that the various steps portrayed in this figure could be omitted, rearranged, combined and/or adapted in various ways.

As depicted by the diagram in FIGS. 2 and 3, the appliance 106 is configured to generate and transmit an authentication request to the authentication server cluster 102 in order to be authenticated to access a plurality of services provided by the service clusters 108s. In some embodiments, the appliance 106 is configured to request for authentication by the authentication server cluster 102 periodically. Here, the authentication request includes an appliance identifier/ID (e.g., serial number) of the appliance 106 as well as other credentials of the user/client associated with the appliance 106 that can be used for authentication purposes. In some embodiments, the authentication request further includes current timestamp of the authentication request.

In some embodiments, the appliance 106 further includes an authentication client library 112, which is an encapsulation layer of the appliance 106 configured to handle secured communication with the authentication server cluster 102. Specifically, the authentication client library 112 is configured to hash a form of a nonce object, which is an arbitrary number used only once in a cryptographic communication, such as the current timestamp of the authentication request, based on one or more cryptographic hash functions such as Secure Hash Algorithm (SHA) or MD 5. The appliance 106 then generates a digital sign/digest by encrypting the hashed value of the nonce object with a system encryption certificate uniquely associated with the appliance ID of the appliance 106. For a non-limiting example, the system encryption certificate can be but is not limited to a RSA key pair (private key for encrypting the authentication request to the authentication server cluster 102 and public key for decrypting a response from the authentication server cluster 102) generated per appliance and is thus unique to the appliance 106. The authentication client library 112 then transmits the authentication request including the appliance ID, the nonce object (e.g., original timestamp), and the encrypted digest (e.g., hashed timestamp) to the authentication server cluster 102 for authentication.

Upon receiving the authentication request from the appliance 106, the authentication server cluster 102 is configured to extract the appliance ID of the appliance 106 from the authentication request, and query an entitlement database 114 to retrieve the corresponding RSA (public) key associated with the appliance ID. If a matching appliance ID of the appliance 106 is not found in the entitlement database 114, the authentication server cluster 102 declines the authentication request and generates a corresponding response to the appliance 106. If the RSA key can be retrieved, the authentication server cluster 102 then decrypts the digest signed by the appliance 106 using the RSA key and verifies its authenticity by comparing the decrypted digest with a new digest calculated based on the original nonce object. If the decrypted digest cannot be verified (e.g., the digests do not match), the authentication request is likely sent by an unauthorized or tampered appliance with the wrong key and the request is declined, thus prohibiting such appliance 106 from accessing any of the services provided by the service clusters 108s.

Following the authentication of the appliance 106 (e.g., the appliance ID exists and the digest is verified), the authentication server cluster 102 is configured to retrieve all information of various services the appliance 106 is entitled to from the entitlement database 114. Here, the service entitlement information of the appliance 106 includes but is not limited to, a list of the services the appliance 106 is entitled to access, privilege, authorized level and time periods of the services to be accessed by the appliance 106, and the identifiers of the service clusters 108s that the appliance 106 is permitted to access for these services.

In some embodiments, the authentication server cluster 102 is configured to query a geographical IP (geo IP) database 116 (e.g., MaxMind Database) to obtain location data (e.g., city, country, region, etc.) of the appliance 106 based on its IP address. Note that the accuracy of the location data of the appliance 106 is dependent upon the granularity of the geographical IP database 116 used; which, for a non-limiting example, can be as accurate as providing pinpoint service allocation at the city level. The authentication server cluster 102 is then configured to identify the service clusters 108 and/or the service nodes 110s within the service clusters 108 that provide the services at the geographical location(s) closest to the appliance 106 based on the location data of the appliance 106, and thus having the fastest response (shortest ping time). Here, various information from geospatial services can be utilized, including but not limited to Web Category Service (WCS), which provides category data of the service clusters 108s that are useful for client-side rendering, Advanced Threat Detection (ATD) and Adaptive AntiVirus (AAV) for virus and threat detection for the service clusters 108s, respectively. If most than one closest service clusters 108 are identified, the authentication server cluster 102 is configured to prioritize these service clusters 108 based on their locations and service coverage. Note that the allocation of the closest service cluster is not limited to a bundle of services since each service can have different levels of geographical distribution. For a non-limiting example, the services and service clusters are not necessarily distributed equally as some services may have X number of presence in a cluster while other services may have Y number of presence in the cluster where X does not always equal to Y.

In some embodiments, the authentication server cluster 102 is configured to initiate communications with each of the appliances 106, the service clusters 108s and their service nodes 110s on regular basis to retrieve relevant information on the status of the appliances and the services being provided. The authentication server cluster 102 is then configured to update the entitlement database 114 and/or the geo IP database 116 accordingly.

Once the entitlement information and the service cluster 108s of the services are identified, the authentication server cluster 102 is configured to generate and transmit an authentication response to the appliance 106, wherein the authentication response includes descriptors for the entitlement and service cluster/service node information of each of the services to be accessed by the appliance 106. In some embodiments, the authentication response is in a language-independent data format such as JavaScript Object Notation (JSON). In some embodiments, the authentication server cluster 102 is configured to encrypt content/payload of the authentication response using the RSA (public) key associated with the appliance ID of the appliance 106 before transmitting the authentication response to the appliance 106.

Upon receiving the authentication response from the authentication server cluster 102, the appliance 106 is configured to decrypt the authentication response (if it is encrypted) using its RSA key and collect the entitlement and service cluster/service node information of each of the services to be accessed. In some embodiments, the appliance 106 is configured to save the collected information in a local cache for later retrieval. Based on the information collected, the appliance 106 is then configured to connect to and access (sending service requests to and receiving service responses from) each of the identified service clusters 108/service nodes 110 directly without the need to be authenticated individually by each of the services accessed. In some embodiments, the appliance 106 is configured to check the health and/or load information of each of the identified service clusters 108/service nodes 110 before sending service requests to them. In the event where some of the service clusters 108/service nodes 110 are not fully operational or overloaded, the appliance 106 is configured to choose to access an alternative service cluster 108/service node 110 instead especially when most than one closest service clusters 108/service nodes 110 have been identified.

Figure 4:
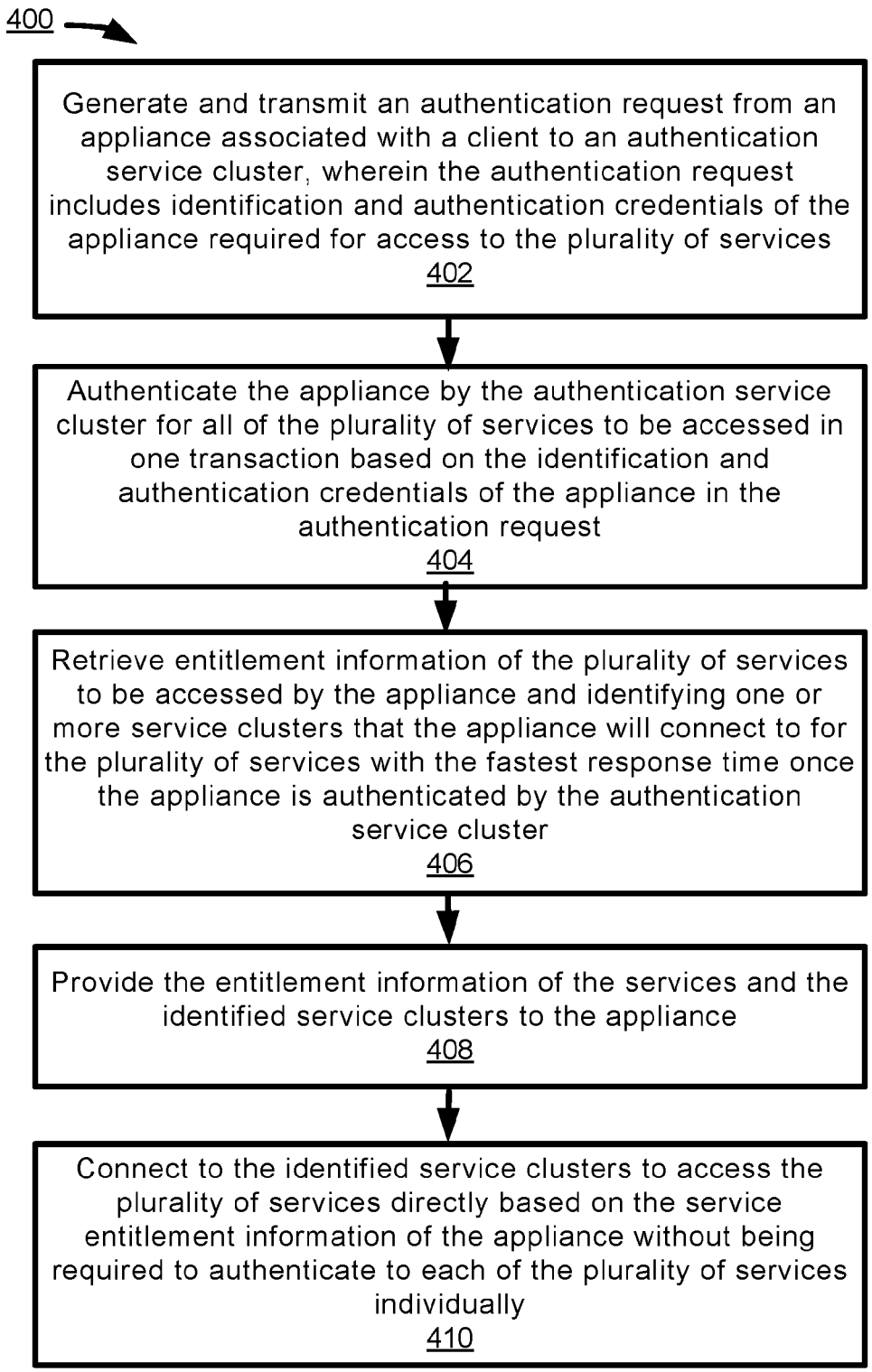
FIG. 4 depicts a flowchart of an example of a process to support bulk authentication of an appliance to all cloud-based services to be accessed in one transaction in accordance with some embodiments.

FIG. 4 depicts a flowchart of an example of a process to support bulk authentication of an appliance to all of a plurality of cloud-based services to be accessed in one transaction. In the example of FIG. 4, the flowchart 400 starts at block 402, where an authentication request is generated and transmitted from an appliance associated with a client to an authentication service cluster, wherein the authentication request includes identification and authentication credentials of the appliance required for access to a plurality of services. The flowchart 400 continues to block 404, where the appliance is authenticated by the authentication service cluster for all of the plurality of services to be accessed in one transaction based on the identification and authentication credentials of the appliance in the authentication request. The flowchart 400 continues to block 406, where the authentication service cluster retrieves entitlement information of the plurality of services to be accessed by the appliance is retrieved and one or more service clusters that the appliance will connect to for the services with the fastest response time is identified once the appliance is authenticated by the authentication service cluster. The flowchart 400 continues to block 408, where the entitlement information of the services and the identified service clusters is provided to the appliance. The flowchart 400 end at block 410 where the services hosted by the identified service clusters are accessed by the appliance directly based on its service entitlement information without being required to authenticate to each of the plurality of services individually.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

The methods and system described herein may be at least partially embodied in the form of computer-implemented processes and apparatus for practicing those processes. The disclosed methods may also be at least partially embodied in the form of tangible, non-transitory machine readable storage media encoded with computer program code. The media may include, for example, RAMs, ROMs, CD-ROMs, DVD-ROMs, BD-ROMs, hard disk drives, flash memories, or any other non-transitory machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application specific integrated circuits for performing the methods.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and with various modifications that are suited to the particular use contemplated.

What is claimed is:

1. A system to support bulk authentication of a device at a geographic location to a plurality of cloud-based services, comprising:
   one or more authentication service clusters, which in operation, are each configured to
      authenticate the device for all of the plurality of services to be accessed in one transaction based on the identification and authentication credentials of the device in an authentication request from the device;
      retrieve entitlement information of the plurality of services to be accessed by the device at the geographic location, wherein the entitlement information of the plurality of services is either stored locally at the authentication service cluster or at another one of the authentication service clusters;
      identify one or more service clusters that the device will connect to for the plurality of services with the fastest response time once the device is authenticated;
      provide the entitlement information of the services and the identified service clusters to the device;
   said device associated with a client at the geographic location, which in operation, is configured to
      hash a nonce object used only once in cryptographic communication based on one or more cryptographic hash functions;
      generate a digital digest by encrypting the hashed value of the nonce object with a system encryption certificate uniquely associated with an ID of the device;
      generate and transmit the authentication request to the authentication service cluster, wherein the authentication request includes one or more of the ID, the nonce object, and the digital digest of the device;
      connnect to the identified service clusters to access the plurality of services directly based on the service entitlement information of the device without being required to authenticate to each of the plurality of services individually.

2. The system of claim 1, wherein:
each of the authentication server clusters further comprises a plurality of authentication servers each configured to authenticate the device for all of the plurality of services in one transaction.

3. The system of claim 1, wherein:
the device is one of a firewall, a web filter, and a gateway of the client.

4. The system of claim 1, wherein:
each of the service clusters further includes a plurality of service nodes configured to share the load within the service cluster for providing the services to the device.

5. The system of claim 1, wherein:
the service clusters are deployed at distributed geographical locations to enable the device to access the services provided by the service clusters in close proximity to reduce network latency.

6. The system of claim 1, wherein:
the device is configured to request for authentication by one of the authentication server clusters periodically.

7. The system of claim 1, wherein:
the nonce object is a timestamp of the authentication request.

8. The system of claim 1, wherein:
each of the one or more cryptographic hash functions is Secure Hash Algorithm (SHA) or MD 5.

9. The system of claim 1, wherein:
the system encryption certificate is a RSA key pair generated per device and is unique to the device.

10. The system of claim 1, wherein:
the authentication request includes one or more of the ID of the device, the nonce object, and the encrypted digest.

11. The system of claim 10, wherein:
the authentication server cluster is configured to extract the ID of the device from the authentication request and decline the authentication request if a matching ID of the device is not found in an entitlement database.

12. The system of claim 10, wherein:
the authentication server cluster is configured to
retrieve the system encryption certificate associated with the ID;
decrypt the digest signed the device using the retrieved system encryption certificate;
verify authenticity of the device by comparing the decrypted digest with a new digest calculated based on the nonce object.

13. The system of claim 1, wherein:
the service entitlement information of the device includes one or more of a list of the services the device in entitled to access, privilege, authorized level and time periods of the services to be accessed by the device, and identifiers of the service clusters that the device is permitted to access for the services.

14. The system of claim 1, wherein:
the authentication server cluster is configured to obtain the geographic location of the device by query a geographical IP database using an IP address of the device.

15. The system of claim 14, wherein:
the authentication server cluster is configured to identify the service clusters and/or the service nodes within the service clusters that provide the services at geographical locations closest to the device based on the location data of the device.

16. The system of claim 15, wherein:
the authentication server cluster is configured to prioritize the service clusters based on their locations and service coverage if most than one closest service clusters are identified.

17. The system of claim 1, wherein:
the device is configured to save the entitlement information of the services and the identified service clusters in a local cache for later retrieval.

18. The system of claim 1, wherein:
the device is configured to check health and/or load information of each of the identified service clusters before connecting to them.

19. A system to support bulk authentication of a device to a plurality of cloud-based services, comprising:
one or more authentication service clusters, which in operation, are each configured to
authenticate the device associated with a client at a geographic location for all of the plurality of services to be accessed in one transaction based on the identification and authentication credentials of the device in an authentication request generated by and transmitted from the device, wherein the authentication request includes one or more of an ID, a nonce object used once in cryptographic communication based on one or more cryptographic hash functions, and a digital digest generated by encrypting a hashed value of the nonce object with a system encryption certificate uniquely associated with the ID;
retrieve entitlement information of the plurality of services to be accessed by the device, wherein the entitlement information of the plurality of services is either stored locally at the authentication service cluster or at another one of the authentication service clusters;
identify one or more service clusters that the device will connect to for the plurality of services with the fastest response time once the device is authenticated;
enable the device to connect to the identified service clusters to access the plurality of services directly based on the service entitlement information of the device without being required to authenticate to each of the plurality of services individually.

20. A computer-implemented method to support bulk authentication of a device at a geographic location to a plurality of cloud-based services, comprising:
hashing a nonce object used only once in cryptographic communication based on one or more cryptographic hash functions;
generating a digital digest by encrypting the hashed value of the nonce object with a system encryption certificate uniquely associated with an ID of the device;
generating and transmitting an authentication request from the device associated with a client to one of one or more authentication service clusters, wherein the authentication request includes the ID, the nonce object, and the digital digest of the device required for access to the plurality of services;
authenticating the device by the authentication service cluster for all of the plurality of services to be accessed in one transaction based on the identification and authentication credentials of the device in the authentication request;
retrieving entitlement information of the plurality of services to be accessed by the device, wherein the entitlement information of the plurality of services is either stored locally at the authentication service cluster or at another one of the authentication service clusters;
identifying one or more service clusters that the device will connect to for the plurality of services with the fastest response time once the device is authenticated by the authentication service cluster;
providing the entitlement information of the services and the identified service clusters to the device;
connecting to the identified service clusters to access the plurality of services directly based on the service entitlement information of the device without being required to authenticate to each of the plurality of services individually.

21. The computer-implemented method of claim 20, further comprising:
deploying the service clusters at distributed geographical locations to enable the device to access the services provided by the service clusters in close proximity to reduce network latency.

22. The computer-implemented method of claim 20, further comprising:
extracting the ID of the device from the authentication request and declining the authentication request if a matching ID of the device is not found in an entitlement database by the authentication server cluster.

23. The computer-implemented method of claim 20, further comprising:
retrieving the system encryption certificate associated with the ID;
decrypting the digest signed the device using the retrieved system encryption certificate;
verifying authenticity of the device by comparing the decrypted digest with a new digest calculated based on the nonce object.

24. The computer-implemented method of claim 20, further comprising:
obtaining the geographic location of the device by query a geographical IP database using an IP address of the device.

25. The computer-implemented method of claim 24, further comprising:
identifying the service clusters and/or the service nodes within the service clusters that provide the services at geographical locations closest to the device based on the location data of the device.

26. The computer-implemented method of claim 24, further comprising:
prioritizing the service clusters based on their locations and service coverage if most than one closest service clusters are identified.

27. The computer-implemented method of claim 20, further comprising:
saving the entitlement information of the services and the identified service clusters in a local cache for later retrieval.

28. The computer-implemented method of claim 20, further comprising:
checking health and/or load information of each of the identified service clusters before connecting to them.

* * * * *

UNITED STATES PATENT AND TRADEMARK OFFICE
CERTIFICATE OF CORRECTION

PATENT NO. : 9,942,050 B2
APPLICATION NO. : 15/586213
DATED : April 10, 2018
INVENTOR(S) : Shi et al.

Page 1 of 1

It is certified that error appears in the above-identified patent and that said Letters Patent is hereby corrected as shown below:

In the Claims

In Column 9, Claim 13, Line 12, please delete "in" and insert -- is --, therefor.

Signed and Sealed this
Twenty-second Day of May, 2018

Andrei Iancu
*Director of the United States Patent and Trademark Office*